No. 807,505. PATENTED DEC. 19, 1905.
A. SCHWARZ.
PROCESS OF CONCENTRATING ORES.
APPLICATION FILED OCT. 14, 1904.
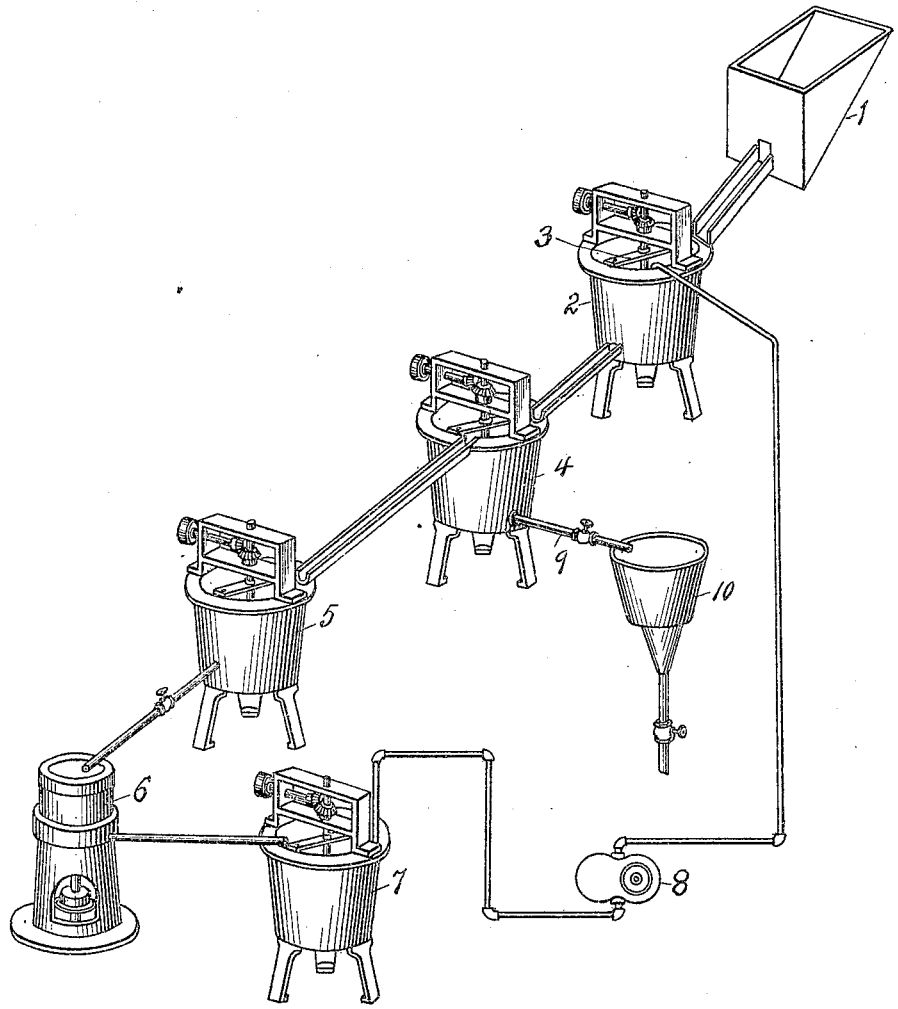
WITNESSES:
Grace L. Heasley.
Harry Schrago.
INVENTOR
Alfred Schwarz
BY
Charles B. Jones.
His ATTORNEY

UNITED STATES PATENT OFFICE.

ALFRED SCHWARZ, OF NEW YORK, N. Y., ASSIGNOR TO SCHWARZ ORE TREATING COMPANY, OF PHŒNIX, ARIZONA TERRITORY, A CORPORATION OF ARIZONA TERRITORY.

PROCESS OF CONCENTRATING ORES.

No. 807,505.　　　　Specification of Letters Patent.　　　　Patented Dec. 19, 1905.

Application filed October 14, 1904. Serial No. 228,443.

*To all whom it may concern:*

Be it known that I, ALFRED SCHWARZ, a subject of the Emperor of Germany, and a resident of the borough of Manhattan, city, county, and State of New York, have invented certain new and useful Improvements in Processes of Concentrating Ores, of which the following is a specification.

The present invention relates to processes for the concentration of ores, and is based upon the use of a mixture of sulfur and a hydrocarbon as an adhesive agent, the invention, broadly stated, consisting in mixing with the pulverized ore an adhesive agent consisting of sulfur or a mixture of sulfur and a hydrocarbon, then separating said agent with the entrapped metallic constituents from the tailings, and finally recovering the values from said agent.

Experiments lead to the opinion that by the use of sulfur in the manner hereinafter described a chemical reaction takes place between the metallic constituents of the ore and the sulfur and that the action is not solely one of adhesion. For that reason I use the term "adhesive agent" in this specification as one of description merely and not as a qualifying term.

In carrying out the invention the initial mixing of the ore and adhesive agent may be effected in various ways. The sulfur, preferably in powdered form, may be dissolved in any of its known solvents and a mixture thereof with the hydrocarbon added to the ore or a direct mixture of sulfur and hydrocarbon without the use of a solvent, for the former may be made and added to the ore, or the sulfur, with or without its solvent, may be first mixed with the ore and the addition of a hydrocarbon made thereafter, or the sulfur and hydrocarbon may be added separately to the ore and a mixture effected by heat and agitation or in any other suitable manner. The ore may be in a dry condition or water or an acid or alkaline solution added thereto in any suitable quantity. I do not, however, wish to limit myself to any particular manner of effecting the desired mixture of ore, sulfur, and hydrocarbon.

The hydrocarbon employed may be one which is solid at normal temperatures and requires to be melted for use, such as paraffin or ozocerite, or a resinous hydrocarbon, such as resin, pitch, or asphaltum, or I may employ a normally liquid hydrocarbon, such as any suitable animal, vegetable, or mineral oil. These hydrocarbons may be used singly or in combinations of two or more, it being understood that the constitution of the agent will depend upon the character of the ore treated, varying as the character of the ore varies.

The separation of the adhesive agent with the entrapped metallic constituents of the ore from the tailings may be effected by treating with cold, heated, or boiling water or an acid or an alkaline solution, all as hereinafter more fully described.

As a specific example of my invention good results have been secured with an adhesive agent consisting of a mixture of paraffin, resin, and sulfur. In practicing the invention the ore is first crushed and screened to a convenient size for handling and then mixed with a composition of paraffin, resin, and sulfur. A convenient way is to melt the paraffin and resin together, dissolving sufficient sulfur therein to make a saturated solution. For the treatment of a free gold ore I have proceeded by dissolving sulfur in melted resin to the point of saturation, using thirty-five per cent., by weight, of the mixture of resin and sulfur to sixty-five per cent., by weight, of paraffin. For a copper-sulfid ore I have used fifteen per cent., by weight, of a compound of resin and sulfur to eighty-five per cent., by weight, of paraffin. I do not, however, wish to limit myself to these proportions, as they may be varied to suit the particular ore treated. The composition of paraffin, resin, and sulfur is then mixed with the ore in any suitable vessel provided with an agitator, heat being employed, if necessary, to maintain the composition in the melted condition. If desired, air, steam, or gas may be injected into the mass to effect or assist the mixing, the composition or adhesive agent being added to the ore in sufficient quantity to make a pasty mass. After an intimate mixture with all parts of the ore has been effected the mass is subjected to the action of heated or boiling water, whereby the earthy or rocky constituents are liberated or washed out and settle in the bottom of the vessel. The metallic constituents of the ore having united with the adhesive agent may be skimmed or screened off and run to a centrifugal drier for the separation and recovery of the concentrates from the adhesive agent. The invention is not limited to the use of boiling water, as water heated below that temperature is sufficient to effect the desired separation under certain circumstances. The term "heated" where used in the claims is intended to include water heated to a sufficient temperature to maintain a normally solid hydrocarbon of the character above specified in a melted condition, and thus to include water heated to the boiling-point.

Instead of subjecting the mass to the action of heated or boiling water, cold water, preferably under pressure, may be injected into the mass, the effect of which will be to solidify or granulate the adhesive agent, which with the entrapped metallic constituents will be floated or screened off, while the tailings being saturated with water will precipitate more or less completely in the bottom of the vessel. By remelting the adhesive agent in a suitable vessel the concentrates may be separated and recovered therefrom by a centrifugal drier, filter-press, or other means. The mass of ore and adhesive agent may first be treated with heated or boiling water and subsequently treated with cold water. Also during the treatment with water, which may be made acid or alkaline, if desired, the mass may be agitated mechanically or by the injection of air, steam, or gas.

The concentrates, if necessary, may be washed with a caustic potash or soda solution to remove any remaining portions of the adhesive agent.

While I have described in giving a specific example of a method of carrying out the invention the use of a mixture of paraffin and resin, either one may be used alone with sulfur or any hydrocarbon of the character above specified may be used singly or in combinations of two or more with sulfur, the method of procedure being the same as above described, except that when using alone a normally liquid hydrocarbon there will be no solidification or granulation of the hydrocarbon if the treatment with cold water is selected as the means for effecting the separation of the concentrates and the tailings.

A modification of the method above described may be practiced by the employment of a plate similar to an ordinary amalgamation-plate, said plate being heated and adapted to receive the adhesive agent in the form of a hydrocarbon with the addition of sulfur and over which the ore with water is run. By such method the ore may be concentrated in a manner similar to amalgamation methods.

The accompanying drawing shows in perspective one arrangement of apparatus by which the process may be carried out.

1 designates a bin or hopper from which the pulverized ore is discharged into a vessel 2, provided with an agitator 3. In this vessel the pulverized ore and selective agent composed of a hydrocarbon and sulfur are intimately mixed, and from said vessel the mass is discharged into a vessel 4, in which it is treated with heated or boiling water acidulated, if desired, to effect the desired separation of the selective agent with the metallic constituents from the tailings. The selective agent with the entrapped metallic constituents will rise to the surface and is then run off by a trough into a storage vessel 5, in which said agent is maintained in a liquid condition. The separation of the values from the selective agent is effected by running the mass into a centrifugal drum 6, the recovered agent being collected in a storage vessel 7, from which it may be raised by a pump 8 to the mixing vessel 2. The vessels 4, 5, and 7 may be provided with agitators, as shown, and they may also be steam-jacketed or otherwise provided with means to maintain in a liquid condition a selective agent which is solid at normal temperatures. The tailings may be drawn off from the vessel 4 by a pipe 9 into a storage-tank 10.

If a selective agent is used which is solid at normal temperatures, the separation from the tailings may be effected in the vessel 4 by the use of cold water. In that case the selective agent will be solidified or granulated and may be collected and remelted in the vessel 5.

I am aware that it has been proposed to effect the separation of metals from their ores by mixing pulverized ore suspended in water with chlorid of sulfur diluted with an oily or greasy matter, and I do not wish to be understood as claiming such method.

What I claim, and desire to secure by Letters Patent, is—

1. The process of concentrating ores consisting in mixing the ore with an adhesive agent composed of a hydrocarbon and sulfur, separating said agent with the entrapped values from the tailings, and recovering the values from the adhesive agent.

2. The process of concentrating ores consisting in mixing the ore out of contact with water with an adhesive agent composed of a hydrocarbon and sulfur, separating said agent with the entrapped values from the tailings, and recovering the values from the adhesive agent.

3. The process of concentrating ores consisting in mixing the ore with an adhesive agent composed of a hydrocarbon which is solid at normal temperatures and sulfur, separating said agent with the entrapped values from the tailings, and recovering the values from the adhesive agent.

4. The process of concentrating ores consisting in mixing the ore with an adhesive agent composed of a resinous hydrocarbon and sulfur, separating said agent with the entrapped values from the tailings, and recovering the values from the adhesive agent.

5. The process of concentrating ores consisting in mixing the ore with an adhesive agent composed of a resinous and a non-resinous hydrocarbon and sulfur, separating said agent with the entrapped values from the tailings, and recovering the values from the adhesive agent.

6. The process of concentrating ores consisting in mixing the ore with an adhesive agent composed of resin, paraffin and sulfur, separating said agent with the entrapped values from the tailings, and recovering the values from the adhesive agent.

7. The process of concentrating ores consisting in mixing the ore with an adhesive agent composed of resin and sulfur, separating said agent with the entrapped values from the tailings, and recovering the values from the adhesive agent.

8. The process of concentrating ores consisting in mixing the ore with an adhesive agent composed of a hydrocarbon and sulfur, washing the mixture with water, separating the said agent with its entrapped values from the tailings, and recovering the values from said agent.

9. The process of concentrating ores consisting in mixing the ore with an adhesive agent composed of a hydrocarbon and sulfur, washing the mixture with heated water, separating the said agent with its entrapped values from the tailings, and recovering the values from said agent.

In witness whereof I have signed my name to this specification in the presence of two subscribing witnesses.

ALFRED SCHWARZ.

Witnesses:
 E. F. PORTER,
 ALEXANDER S. RODMAN.